(12) United States Patent
Takahashi

(10) Patent No.: US 11,039,070 B2
(45) Date of Patent: Jun. 15, 2021

(54) ELECTRONIC DEVICE FOR SELECTING A CANDIDATE FROM A CANDIDATE GROUP AND CHANGING A CANDIDATE GROUP, CONTROL METHOD OF ELECTRONIC DEVICE, AND NON-TRANSITORY COMPUTER READABLE MEDIUM

(71) Applicant: CANON KABUSHIKI KAISHA, Tokyo (JP)

(72) Inventor: Tsukasa Takahashi, Miura-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/354,940

(22) Filed: Mar. 15, 2019

(65) Prior Publication Data

US 2019/0289212 A1    Sep. 19, 2019

(30) Foreign Application Priority Data

Mar. 19, 2018 (JP) .............................. JP2018-050668

(51) Int. Cl.
*H04N 5/232* (2006.01)
*H04N 5/235* (2006.01)
(Continued)

(52) U.S. Cl.
CPC ....... *H04N 5/23245* (2013.01); *G06F 3/0416* (2013.01); *G06F 3/0488* (2013.01); *H04N 5/2354* (2013.01); *H04N 5/23216* (2013.01)

(58) Field of Classification Search
CPC ............ H04N 5/23245; H04N 5/2354; H04N 5/23216; H04N 5/232; G06F 3/0416;
(Continued)

(56) References Cited

U.S. PATENT DOCUMENTS

2006/0019717 A1    1/2006  Gong
2009/0167887 A1*   7/2009  Ueda .................. H04N 1/00405
                                                   348/222.1
(Continued)

FOREIGN PATENT DOCUMENTS

JP    60-162371 A    8/1985
JP    2004-177409 A  6/2004
(Continued)

OTHER PUBLICATIONS

A British Search Report dated Sep. 9, 2019, which is enclosed, that issued in the corresponding British Patent Application No. 1903497.4.

*Primary Examiner* — Padma Haliyur
(74) *Attorney, Agent, or Firm* — Cowan, Liebowitz & Latman, P.C.

(57) ABSTRACT

An electronic device includes a control unit configured to perform control to: in a first state where a first selectable candidate group is assigned to an current candidate group, switch from selecting a first candidate of the first candidate group to selecting a second candidate of the first candidate group in response to an first type operation of a specific operating member; in the first state, change from the first state to a second state, where a second selectable candidate group is assigned to the current candidate group, in response to a second type operation of the specific operating member; in the second state, switch from selecting a first candidate of the second candidate group to selecting a second candidate of the second candidate group in response to the first type operation of the specific operating member.

33 Claims, 8 Drawing Sheets

(51) Int. Cl.
*G06F 3/0488* (2013.01)
*G06F 3/041* (2006.01)

(58) Field of Classification Search
CPC .. G06F 3/0488; G06F 3/0482; G06F 3/04812; G06F 3/0236; H03M 11/10
See application file for complete search history.

(56) References Cited

U.S. PATENT DOCUMENTS

| | | | | |
|---|---|---|---|---|
| 2012/0274796 | A1* | 11/2012 | Choi | H04N 5/232 348/220.1 |
| 2015/0222841 | A1* | 8/2015 | Kwak | H04N 21/4316 348/239 |
| 2015/0227025 | A1* | 8/2015 | Park | H05B 45/22 348/224.1 |
| 2015/0319806 | A1* | 11/2015 | Li | H04M 1/72552 455/412.2 |
| 2017/0272589 | A1* | 9/2017 | Yoshimi | H04N 1/00416 |
| 2019/0141258 | A1* | 5/2019 | Yoshida | H04N 5/232939 |

FOREIGN PATENT DOCUMENTS

| | | |
|---|---|---|
| JP | 2004-310519 A | 11/2004 |
| JP | 2009-075928 A | 4/2009 |

\* cited by examiner

ELECTRONIC DEVICE FOR SELECTING A CANDIDATE FROM A CANDIDATE GROUP AND CHANGING A CANDIDATE GROUP, CONTROL METHOD OF ELECTRONIC DEVICE, AND NON-TRANSITORY COMPUTER READABLE MEDIUM

BACKGROUND OF THE INVENTION

Field of the Invention

The present invention relates to an electronic device, a control method of an electronic device, a program, and a non-transitory computer readable medium.

Description of the Related Art

There is a limit to the number of buttons (operating members) provided on electronic devices and, with the downsizing of electronic devices, the number of buttons is highly likely to decrease. Therefore, favorably, simple operations on a small number of buttons enable a large amount of selectable candidates (information and instructions) to be input (selected). Conventional art related to the operation of an electronic device is disclosed in, for example, Japanese Patent Application Laid-open No. 2004-310519 and Japanese Patent Application Laid-open No. 2004-177409.

Japanese Patent Application Laid-open No. 2004-310519 discloses a technique related to Japanese character input. With the technique disclosed in Japanese Patent Application Laid-open No. 2004-310519, input characters are switched among a plurality of characters included in a character group in response to short-pressing of a key and the input characters are switched to repeat consonant characters included in the character group in response to long-pressing of the key.

Japanese Patent Application Laid-open No. 2004-177409 discloses a technique related to input of year, month, day, and time. With the technique disclosed in Japanese Patent Application Laid-open No. 2004-177409, reception of a year input commences in response to long-pressing of a depressible roller member, an input year is changed by rotating the roller member and, in response to short-pressing of the roller member, the input year is set and reception of a month input commences.

However, with the technique disclosed in Japanese Patent Application Laid-open No. 2004-310519, another key must be depressed in order to input a character included in another character group. Therefore, a plurality of keys must be depressed in order to input a plurality of characters of a plurality of character groups.

With the technique disclosed in Japanese Patent Application Laid-open No. 2004-177409, year, month, day, and time can be input solely by operations performed on the roller member. However, inputting (selecting) year, month, day, and time requires rotating and depressing the roller member. In addition, an installation position of the rotatable roller member is more limited than the installation position of an operating member which can only be depressed.

Furthermore, in some electronic devices it is possible to change the function assigned to a specific operating member by using a graphical user interface (GUI) menu. However, to allow a function assigned to a given operating member to be changed, a plurality of other operating members (such as: a MENU button; up, down, left, right keys; and an OK button) are required in order to select and change the function of the given operating member. In addition, if a device only has space for a small display unit for displaying a GUI menu, it is difficult to make this display unit a touch display and, it would still be difficult to perform accurate touch operations on the display for interacting with the GUI menu.

In consideration thereof, the present invention provides a technique that enables a larger number of selectable candidates to be selected with good operability solely by depressing one operating member.

SUMMARY OF THE INVENTION

An electronic device according to a first aspect of the present invention, includes a memory and at least one processor which function as a control unit configured to perform control to: in a first state where a first selectable candidate group is assigned to an current candidate group, switch from selecting a first candidate of the first candidate group to selecting a second candidate of the first candidate group in response to an first type operation of a specific operating member, wherein the first type operation is an operation which finishes before a first time period after the operation starts; in the first state, change from the first state to a second state, where a second selectable candidate group is assigned to the current candidate group, in response to a second type operation of the specific operating member continuing for the first time period or more; in the second state, switch from selecting a first candidate of the second candidate group to selecting a second candidate of the second candidate group in response to the first type operation of the specific operating member.

According to the present invention, a larger number of selectable candidates can be selected with good operability solely by depressing one operating member.

Further features of the present invention will become apparent from the following description of exemplary embodiments with reference to the attached drawings.

DESCRIPTION OF THE EMBODIMENTS

Figure 1A:
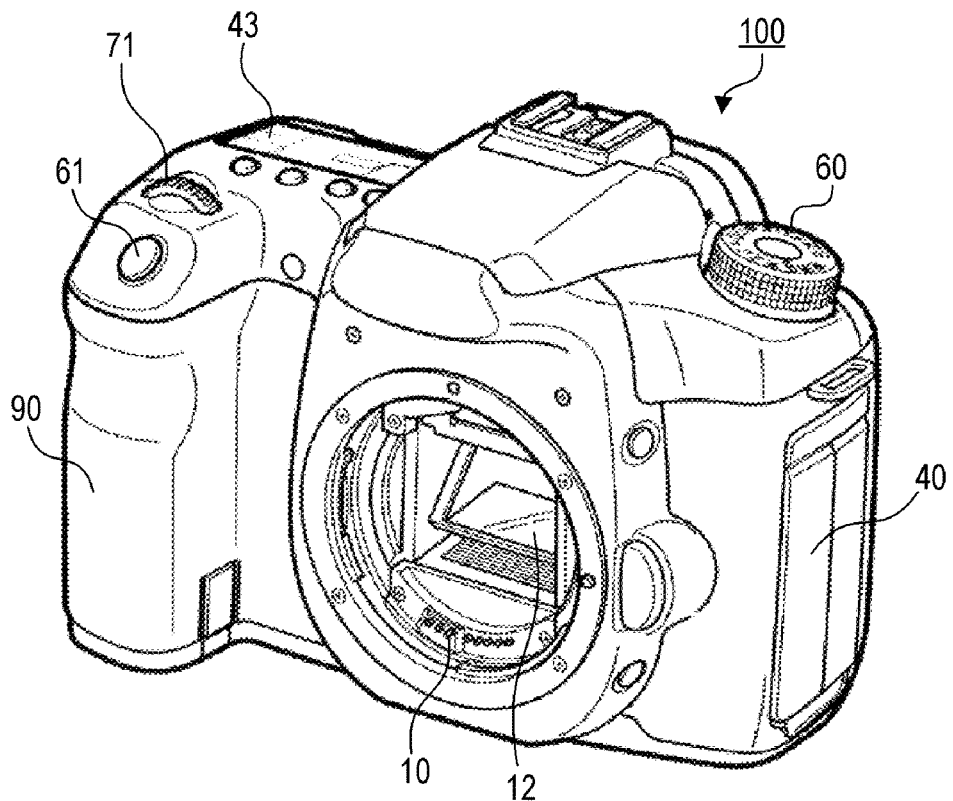
FIGS. 1A and 1B are external views of a digital camera according to an embodiment.
Figure 1B:
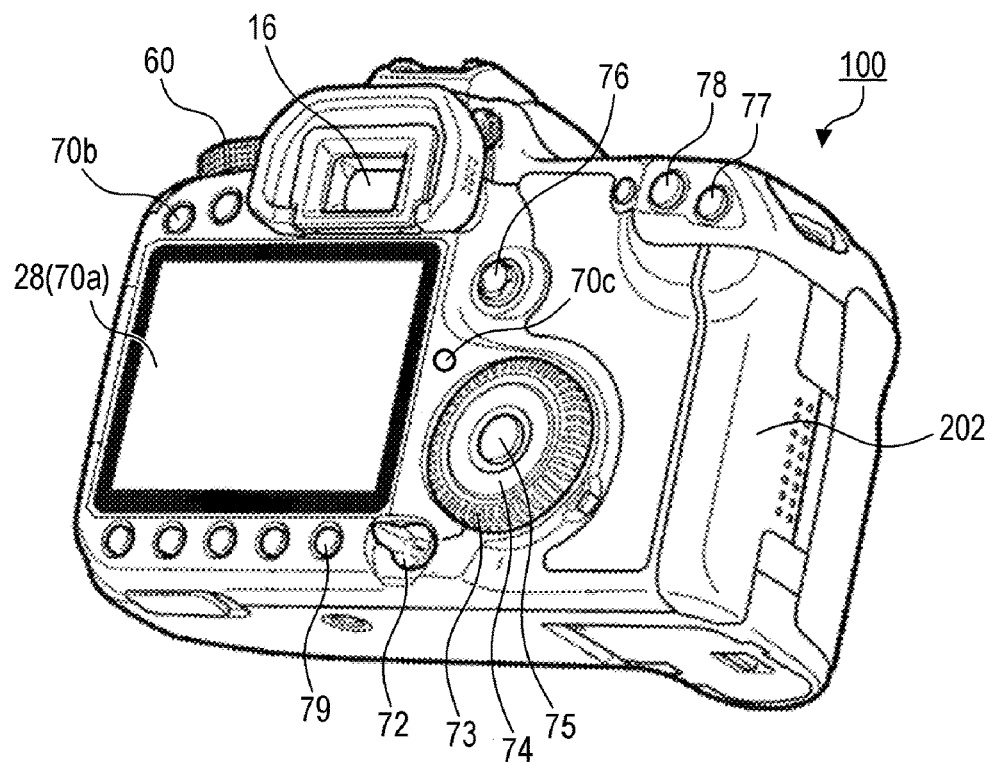

Hereinafter, a preferred embodiment of the present invention will be described with reference to the drawings. FIGS. 1A and 1B show external views of a digital camera 100 as an example of an apparatus to which the present invention can be applied. FIG. 1A is a front perspective view of the digital camera 100, and FIG. 1B is a rear perspective view of the digital camera 100.

A display unit 28 is a display unit provided on a rear surface of the digital camera 100 for displaying images and various types of information. A finder external display unit 43 is a display unit provided on an upper surface of the digital camera 100 for displaying various setting values of the digital camera 100 including shutter speed and aperture. A terminal cover 40 is a cover for protecting a connector (not illustrated) for a connection cable or the like which connects the digital camera 100 to an external device. A quick return mirror 12 is raised and lowered by an actuator (not illustrated) under instructions from a system control unit 50 (to be described later). A communication terminal 10 is a communication terminal used by the digital camera 100 to communicate with a lens unit 150 (to be described later; attachable and detachable). An eyepiece finder 16 is a look-in finder for checking a focus and a composition of an optical image of an object obtained through the lens unit 150 by observing a focusing screen 13 (to be described later). A lid 202 is a lid of a slot in which a recording medium 200 (to be described later) is stored. A grip portion 90 is a holding portion configured in a shape readily gripped by the right hand of a user when holding the digital camera 100.

In addition, the digital camera 100 has a mode changeover switch 60, a shutter button 61, a main electronic dial 71, a power switch 72, a sub electronic dial 73, a four-way key 74, a SET button 75, and an LV button 76. The digital camera 100 also has an enlargement button 77, a reduction button 78, a playback button 79, a touch panel 70a, and a menu button 70b. The digital camera 100 may have other operating members. The various operating members will be described later.

Figure 2:
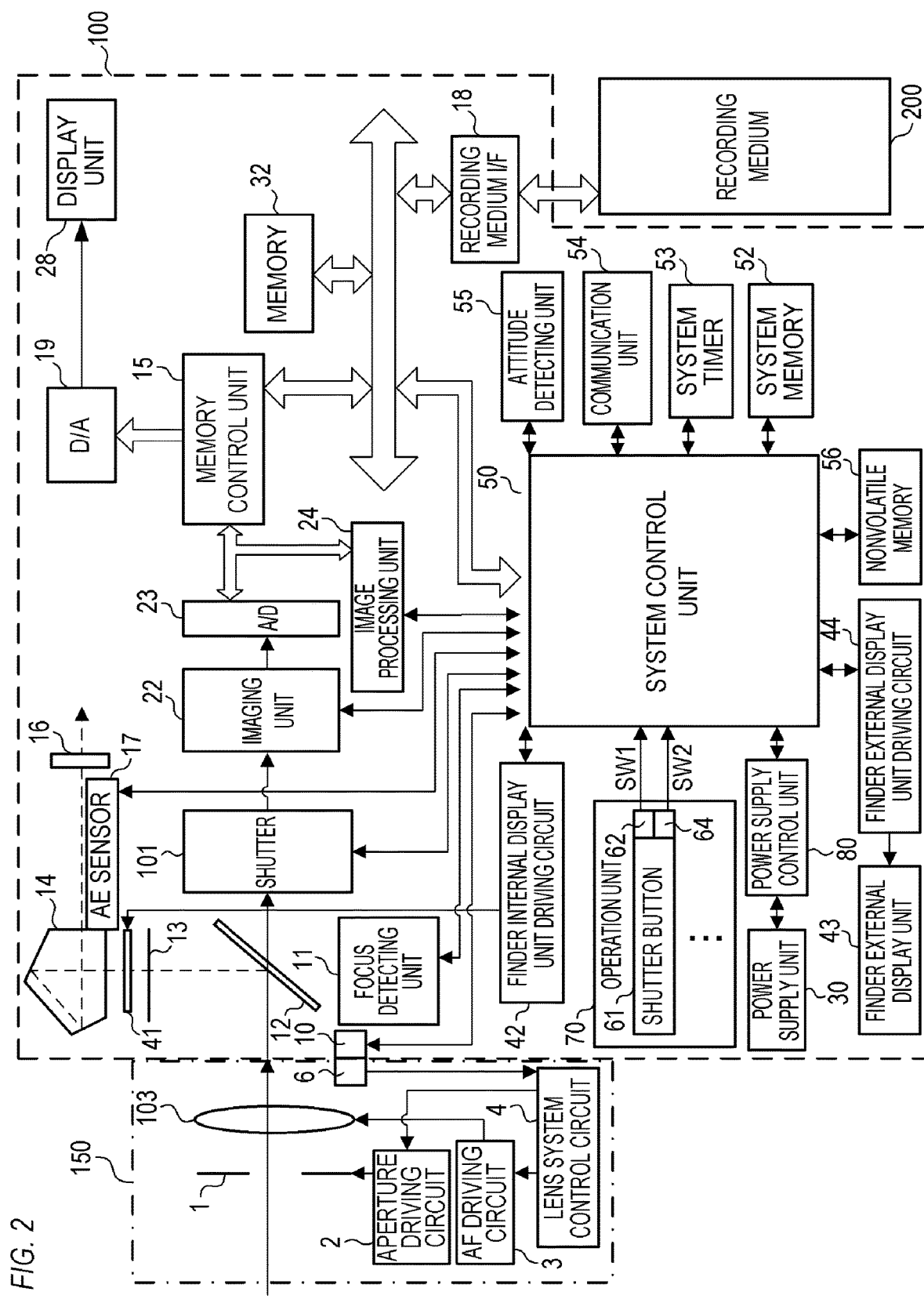
FIG. 2 is a block diagram of the digital camera according to the present embodiment.

FIG. 2 is a block diagram showing a configuration example of the digital camera 100.

The lens unit 150 is a lens unit mounted with a replaceable photographing lens. While a lens 103 is usually configured by a plurality of lenses, in FIG. 2, the lens 103 is shown simplified with only one lens. A communication terminal 6 is a communication terminal used by the lens unit 150 to communicate with the digital camera 100, and the communication terminal 10 is a communication terminal used by the digital camera 100 to communicate with the lens unit 150. The lens unit 150 communicates with the system control unit 50 via the communication terminals 6 and 10. In addition, the lens unit 150 controls an aperture 1 via an aperture driving circuit 2 using an internal lens system control circuit 4. Furthermore, the lens unit 150 performs focusing by displacing a position of the lens 103 via an AF driving circuit 3 using the lens system control circuit 4.

An automatic exposure (AE) sensor 17 measures brightness of the object (object light) through the lens unit 150.

A focus detecting unit 11 outputs information on a defocus amount to the system control unit 50. The system control unit 50 controls the lens unit 150 based on the defocus amount information to perform phase difference AF.

The quick return mirror 12 (hereinafter, the mirror 12) is raised and lowered by an actuator (not illustrated) under instructions from the system control unit 50 during exposure, live view photography, moving image photography, and the like. The mirror 12 is a mirror for switching a luminous flux incident from the lens 103 between a side of the finder 16 and a side of an imaging unit 22. While the mirror 12 is normally disposed so as to guide (reflect) the luminous flux to the finder 16 (mirror down), when photography and live view display are performed, the mirror 12 is flipped upward so as to guide the luminous flux to the imaging unit 22 and is retracted from inside the luminous flux (mirror up). In addition, the mirror 12 is configured as a half mirror so that light can be partially transmitted through a central portion thereof, and the mirror 12 causes a part of the luminous flux to be transmitted and incident to the focus detecting unit 11 for performing focus detection.

By observing the focusing screen 13 via a pentaprism 14 and the finder 16, a photographer can check a focus and a composition of an optical image of an object obtained through the lens unit 150.

A shutter 101 is a focal plane shutter capable of freely controlling an exposure time of the imaging unit 22 under the control of the system control unit 50.

The imaging unit 22 is an imaging element constituted by a device such as a CCD or a CMOS which converts an optical image into an electrical signal. An A/D converter 23 converts an analog signal output from the imaging unit 22 into a digital signal.

An image processing unit 24 performs predetermined processes (pixel interpolation, a resizing process such as reduction, a color conversion process, and the like) on data from the A/D converter 23 or data from a memory control unit 15. In addition, the image processing unit 24 performs a predetermined computing process using image data of a captured image, and the system control unit 50 performs exposure control and ranging control based on a computation result obtained by the image processing unit 24. Accordingly, processes such as an automatic focusing (AF) process, an AE process, and a preliminary light emission before flash (EF) process in a through-the-lens (TTL) system are performed. The image processing unit 24 further performs a predetermined computing process using image data of a captured image and performs an automatic white balance (AWB) process in the TTL system based on an obtained computation result.

Output data from the A/D converter 23 is directly written into a memory 32 via the image processing unit 24 and the memory control unit 15 or via the memory control unit 15. The memory 32 stores image data obtained by the imaging unit 22 and converted into digital data by the A/D converter 23 and image data to be displayed on the display unit 28. The memory 32 has sufficient storage capacity for storing a predetermined number of still images and a predetermined time's worth of moving images and audio.

In addition, the memory 32 also doubles as a memory (a video memory) for image display. A D/A converter 19 converts data for image display stored in the memory 32 into an analog signal and supplies the analog signal to the display unit 28. In this manner, image data for display having been written into the memory 32 is displayed by the display unit 28 via the D/A converter 19. The display unit 28 performs display in accordance with an analog signal from the D/A converter 19 on a display such as an LCD. An electronic view finder function can be realized and a live image display (a live view display) can be performed by subjecting digital signals having been subjected to A/D conversion by the A/D converter 23 and accumulated in the memory 32 to D/A conversion by the D/A converter 19, and sequentially transmitting the signals having been subjected to D/A conversion to the display unit 28 and displaying the signals. Hereinafter, an image displayed by a live view display will be referred to as an "LV image".

A finder internal display unit 41 displays, via a finder internal display unit driving circuit 42, a frame (an AF frame) indicating a ranging point on which automatic focusing is currently being performed, icons representing a setting state of the camera, and the like.

The finder external display unit 43 displays, via a finder external display unit driving circuit 44, various setting values of the digital camera 100 including a shutter speed and an aperture.

A nonvolatile memory 56 is an electrically erasable and recordable memory and, for example, an EEPROM is used. Constants, a program, and the like for operations of the system control unit 50 are stored in the nonvolatile memory 56. In this case, the program refers to a program for executing the various flow charts described later in the present embodiment.

The system control unit 50 is a control unit constituted by at least one processor or one circuit and controls the entire digital camera 100. The system control unit 50 realizes the respective processes of the present embodiment (to be described later) by executing the program recorded in the nonvolatile memory 56 described earlier. A system memory 52 is, for example, a RAM, and the system control unit 50 deploys constants and variables for the operations of the system control unit 50, the program read from the nonvolatile memory 56, and the like on the system memory 52. In addition, the system control unit 50 also performs display control by controlling the memory 32, the D/A converter 19, the display unit 28, and the like.

A system timer 53 is a time-measuring unit for measuring time used in various controls and for measuring time according to an internal clock.

A power supply control unit 80 is constituted by a battery detection circuit, a DC-DC converter, a switching circuit for switching between blocks to be energized, and the like, and detects whether or not a battery is mounted, a type of the battery, a remaining battery level, and the like. In addition, the power supply control unit 80 controls the DC-DC converter based on the detection results and an instruction from the system control unit 50 and supplies respective units including the recording medium 200 with necessary voltage for a necessary period of time. A power supply unit 30 is constituted by a primary battery such as an alkaline battery or a lithium battery, a secondary battery such as a NiCd battery, a NiMH battery, or a Li battery, an AC adapter, or the like.

A recording medium I/F 18 is an interface with the recording medium 200 that is a memory card, a hard disk, or the like. The recording medium 200 is a recording medium such as a memory card for recording photographed images and is constituted by a semiconductor memory, a magnetic disk, or the like.

A communication unit 54 transmits and receives video signals and audio signals to and from an external device connected wirelessly or by a wired cable. The communication unit 54 is also capable of connecting to a wireless local area network (LAN) or the Internet. In addition, the communication unit 54 is also capable of communicating with the external device using Bluetooth (registered trademark) or Bluetooth Low Energy. The communication unit 54 is capable of transmitting images (including LV images) captured by the imaging unit 22 and images recorded on the recording medium 200 and receiving image data and various other types of information from the external device.

An attitude detecting unit 55 detects an attitude of the digital camera 100 relative to a direction of gravitational force. Based on the attitude detected by the attitude detecting unit 55, a determination can be made as to whether an image photographed by the imaging unit 22 is an image photographed while holding the digital camera 100 horizontally or an image photographed while holding the digital camera 100 vertically. The system control unit 50 can add direction information in accordance with the attitude detected by the attitude detecting unit 55 to an image file of an image (a picked-up image) captured by the imaging unit 22 and record a rotated version of the image or the like. An acceleration sensor, a gyro sensor, or the like can be used as the attitude detecting unit 55. A motion (pan, tilt, uplifted, whether stationary or not, and the like) of the digital camera 100 can also be detected using the acceleration sensor or the gyro sensor that constitutes the attitude detecting unit 55.

An operating unit 70 is an operating unit for inputting various operation instructions to the system control unit 50. The operating unit 70 includes various operating members as an input unit. For accepting operations (user operations) from the user. For example, the operating unit 70 comprises various operating members such as a push button, a rotating dial, a touch sensor, and the like. Specifically, the operating unit 70 includes the mode changeover switch 60, the shutter button 61, the main electronic dial 71, the power switch 72, the sub electronic dial 73, and the four-way key 74. The operating unit 70 also includes the SET button 75, the LV button 76, the enlargement button 77, the reduction button 78, the playback button 79, the touch panel 70a, and the menu button 70b. For example, functions may be displayed on the display unit 28 and a user may be allowed select one of these functions for assignment to an operating member of the operating unit 70. In some cases, the assigned function of an operating member may change, or be changed, for each scene. Examples of buttons which have a function include an end button, a return button, an image feed button, a jump button, a narrow-down button, and an attribute change button.

The mode changeover switch 60 is an operating member for switching between various modes. The mode changeover switch 60 switches an operating mode of the system control unit 50 to any of a still image recording mode, a moving image photography mode, a playback mode, and the like. Modes included in the still image recording mode are an automatic photography mode, an automatic scene determination mode, a manual mode, an aperture priority mode (Av mode), a shutter speed priority mode (Tv mode), and a program AE mode. Other available modes include various scene modes that constitute photography settings for different photography scenes as well as custom modes. Using the mode changeover switch 60, the user can directly switch to any of these modes. Alternatively, after temporarily switching to a photography mode list screen using the mode changeover switch 60, another operating member may be used to selectively switch to any of a plurality of displayed modes. In a similar manner, the moving image photography mode may also include a plurality of modes.

The shutter button 61 is an operating member for issuing a photography instruction. The shutter button 61 includes a first shutter switch 62 and a second shutter switch 64. The first shutter switch 62 is turned on midway through an operation of the shutter button 61 by a so-called half-press (photography preparation instruction) and generates a first shutter switch signal SW1. In accordance with the first shutter switch signal SW1, the system control unit 50 starts an operation of an AF process, an AE process, an AWB process, an EF process, and the like. The second shutter switch 64 is turned on upon completion of an operation of the shutter button 61 by a so-called full-press (photography instruction) and generates a second shutter switch signal SW2. In accordance with the second shutter switch signal SW2, the system control unit 50 starts a series of operations of a photography process from reading a signal from the imaging unit 22 to writing image data into the recording medium 200.

The main electronic dial 71 is a rotating operating member and, by turning the main electronic dial 71, setting values such as shutter speed and aperture can be changed. The power switch 72 is an operating member for switching power of the digital camera 100 on and off. The sub electronic dial 73 is a rotating operating member and, by turning the sub electronic dial 73, operations such as moving a selection frame and scrolling through images can be performed. The four-way key 74 is configured such that upper, lower, left, and right portions are respectively depressible. The four-way key 74 enables a process corresponding to a depressed portion of the four-way key 74 to be performed. The SET button 75 is a push button mainly used to determine a selected item.

The LV button 76 is a button for switching a live view (hereinafter, an LV) on and off in the still image photography mode. In the moving image photography mode, the LV button 76 is used to issue instructions to start and stop moving image photography (recording). The enlargement button 77 is an operating button for switching an enlargement mode on and off during a live view display in the photography mode and changing enlargement rates in the enlargement mode. In the playback mode, the enlargement button 77 functions as an enlargement button for enlarging a reproduced image or increasing an enlargement rate of the reproduced image. The reduction button 78 is a button for reducing the enlargement rate of an enlarged reproduced image and reducing a displayed image. The playback button 79 is an operating button for switching between the photography mode and the playback mode. By depressing the playback button 79 in the photography mode, a transition can be made to the playback mode and a latest image among images recorded in the recording medium 200 can be displayed on the display unit 28.

The touch panel 70a detects a touch with respect to the touch panel 70a. The touch panel 70a and the display unit 28 can be integrally constructed. For example, the touch panel 70a is configured such that transmittance of light does not obstruct display by the display unit 28 and is mounted to an upper layer of a display surface of the display unit 28. Subsequently, input coordinates on the touch panel 70a and display coordinates on the display unit 28 are associated with each other. Accordingly, a graphical user interface (GUI) can be provided which enables the user to feel as if a screen displayed on the display unit 28 can be directly manipulated. The system control unit 50 may be configured to detect the following operations/states on the touch panel 70a.

A state where a finger or a stylus previously not in touch with the touch panel 70a newly touches the touch panel 70a or, in other words, a start of a touch (hereinafter referred to as a touch-down)

A state where the touch panel 70a is being touched by a finger or a stylus (hereinafter referred to as a touch-on)

A state where a finger or a stylus is moving while in touch with the touch panel 70a (hereinafter referred to as a touch-move)

A state where a finger or a stylus previously in touch with the touch panel 70a separates from the touch panel 70a or, in other words, an end of a touch (hereinafter referred to as a touch-up)

A state where nothing is touching the touch panel 70a (hereinafter referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off is detected upon detection of a touch-up of all of the fingers or a stylus previously in touch.

The system control unit 50 is notified of the operations and states described above as well as a position coordinate where a finger or a stylus touches the touch panel 70a through an internal bus. In addition, based on the notified information, the system control unit 50 determines what kind of operation (touch operation) has been performed on the touch panel 70a. With respect to a touch-move, a movement direction of a finger or a stylus moving on the touch panel 70a can be determined for each of a vertical component and a horizontal component on the touch panel 70a based on a change in the position coordinate. When a touch-move of a predetermined distance or more is detected, it is determined that a slide operation has been performed. An operation involving quickly moving a finger on the touch panel 70a for a certain distance while keeping the finger in touch with the touch panel 70a and then releasing the finger is referred to as a flick. In other words, a flick is an operation in which a finger quickly traces the touch panel 70a as though flicking on the touch panel 70a. A determination that a flick has been performed can be made (a determination that a flick has occurred following a slide operation can be made) when a detection of a touch-move of a predetermined distance or more at a predetermined speed or more is followed by a detection of a touch-up. Furthermore, a touch operation involving touching a plurality of locations (for example, two points) at the same time and bringing the respective touch positions close to each other is referred to as a pinch-in while a touch operation in which the respective touch positions are distanced from each other is referred to as a pinch-out. A pinch-out and a pinch-in are collectively referred to as a pinch operation (or, simply, a pinch). As the touch panel 70a, a touch panel adopting any of various systems including a resistive film system, a capacitance system, a surface acoustic wave system, an infrared system, an electromagnetic induction system, an image recognition system, and an optical sensor system may be used. Any of a system in which a touch is detected when contact is made with the touch panel and a system in which a touch is detected when a finger or a stylus approaches the touch panel may be adopted.

The menu button 70b is a push button (a push button switch) and, when the menu button 70b is depressed, a menu screen enabling various settings to be set may be displayed on the display unit 28. It will be appreciated that conventionally a user may set various settings using the menu screen displayed on the display unit 28 together with the four-way key 74 and the SET button 75. However, described below are examples wherein a user may set various settings in an efficient manner using a single button.

Herein, a setting candidate may be a setting value/parameter. A set of 'setting candidates' may be included in a given 'setting candidate group'. For example, in FIG. 4, different sets of setting candidates are included in different groups—e.g. setting candidates [A-1] to [A-4] are included in setting candidate group A. When accessing a given 'setting candidate group', a user may select one of the 'setting candidates' included in that 'setting candidate group'. An example of selecting a 'setting candidate' in a given 'setting candidate group' will now be described with reference to FIG. 3. FIG.

3 is a flow chart of certain processes that may be performed by the digital camera 100. Each process in the flow chart may be performed by the system control unit 50. The functions may be part of a program stored in the non-volatile memory and the system control unit may execute the program to perform/access the functions. The flow chart shown in FIG. 3 commences in response to, for example, turning on power to the digital camera 100. In this case, it is assumed that one or more shortcut functions are assigned to push button 70b for selecting a setting candidate (a setting value; a setting parameter) in one or more setting candidate groups. Specifically, it is assumed that the selection of a setting candidate in a setting candidate group (which may also be referred to herein as a selectable candidate group) is changed in response to a short-press of the push button 70b. It is also assumed that the camera has a plurality of 'setting candidate groups', wherein each of these groups includes a plurality of 'setting candidates'. To access a given setting candidate group, the given setting candidate group must be assigned to an "current candidate group" ("assigned candidate group"). That is, for example, if a user wishes to access setting candidate group B in FIG. 4 in order to change the selection of a setting candidate therein (i.e. [B-1] to [B-4]), the user must assign setting candidate group B to the 'current candidate group'. And, if the user subsequently wishes access setting candidate group C in FIG. 4 to change the selection of a setting candidate therein ([C-1] to [C-3]), the user must then assign setting candidate group C to the 'current candidate group'. Thus, it will be appreciated that the 'current candidate group' indicates which one of the setting candidate groups is being, or is to be, accessed. And, as described further below, a long-press of push button 70b is configured to change the assignment of the current candidate group to a different setting candidate group.

In S301, the system control unit 50 determines whether or not the power switch 72 has been operated by the user to instruct power to be turned off. When it is determined that an instruction to turn off power has been issued, the operation processing is ended, but otherwise the system control unit 50 proceeds to S302.

The non-operation time T1 is a measure of the duration in which the camera is in a non-operative state during which no operative members are used (i.e. when the camera is in an idle state). The duration of the non-operative state may be measured by the system timer 53. At S302, the system control unit 50 resets the non-operation time T1 to zero and, after the reset, starts counting again to monitor the duration of the non-operative state.

In S303, the system control unit 50 determines whether or not the non-operation time T1 is shorter than 3 seconds. When it is determined that the non-operation time T1 is shorter than 3 seconds, the system control unit 50 advances to S305, but otherwise the system control unit 50 advances to S304.

In S304, the system control unit 50 causes a transition of the operating mode of the digital camera 100 from a specific operating mode (in the present embodiment, a setting mode for changing a selected setting candidate) to another operating mode (e.g. release of the setting mode or rather a non-setting mode). In other words, when a non-operation state continues for 3 seconds (continues for a threshold time) in the setting mode, a transition is made to another operating mode in which the setting mode has been released. Moreover, when the setting mode has been released, the process of S305 is skipped. Thus, it will be appreciated that the camera may enter the setting mode after powering on and, to keep the camera in this mode, a user must operate the camera 100 within less than the threshold time (e.g. 3 seconds). If the camera 100 is not operated within the threshold time (e.g. left idle for 3 seconds from powering on the camera 100), the camera escapes the setting mode.

While details will be provided later, in the setting mode, under the control of the system control unit 50, the display unit 28 indicates a setting candidate group to be assigned to the current candidate group. In the present embodiment, one setting candidate group corresponds to one setting item. In addition, in the setting mode, the system control unit 50 displays a setting item corresponding to a setting candidate group to be assigned to the current candidate group on the display unit 28. Furthermore, the system control unit 50 hides the setting item when causing a transition of the operating mode of the digital camera 100 from the setting mode to an operating mode in which the setting mode has been released.

The threshold time used in S303 is not limited to 3 seconds. However, if the threshold time in S303 is too short, the likelihood that a transition to another operating mode occurs despite the user desiring to maintain the setting mode increases. Therefore, the threshold time of S303 is preferably somewhat long. For example, the threshold time of S303 is preferably longer than 2 seconds.

In S305, the system control unit 50 determines whether or not the push button 70b has been depressed. When it is determined that the push button 70b has been depressed (a start of an operation of the push button 70b), the system control unit 50 advances to S306, but otherwise the system control unit 50 advances to S303. An operation may be performed on an operating member other than the push button 70b among the plurality of operating members of the digital camera 100. In such a case, the system control unit 50 performs control corresponding to the operating member on which the operation had been performed (the system control unit 50 does not proceed to S303 and S306). Subsequently, the system control unit 50 advances to S301. When an operation on an operating member other than the push button 70b has not been performed, the system control unit 50 advances to S303. Alternatively, the non-operation timer T1 may indicate a duration of a state in which the push button 70b is not operated. In such a case, when an operation on an operating member other than the push button 70b is performed, the system control unit 50 advances to S303 instead of S301.

The depression time T2 is a measure of the duration over which push button 70b is depressed during a single press (depressed state)—i.e. T2 measures the time push button 70b is held down for during a single press. At S306, the system control unit 50 resets a depression time T2 to zero and, after the reset, starts counting of the time T2. The depression time T2 may be measured by the system timer 53 each time push button 70b is depressed.

In S307, the system control unit 50 determines whether or not the operating mode of the digital camera 100 is the setting mode. When it is determined that the operating mode is the setting mode, the system control unit 50 advances to S312, but otherwise the system control unit 50 advances to S308.

In S308, the system control unit 50 determines whether or not the depression of the push button 70b has been released. When it is determined that the depression of the push button 70b has been released (an end of an operation of the push button 70b), the system control unit 50 advances to S309, but otherwise the system control unit 50 stands by.

In S309, the system control unit 50 determines whether or not the depression time T2 is 1 second or more or, in other words, whether or not the depression of the push button 70b is long-pressing. When it is determined that the depression time T2 is 1 second or more (long-pressing of the push button 70b), the system control unit 50 advances to S310, but otherwise the system control unit 50 advances to S301. In other words, even when short-pressing (depression of shorter than 1 second) of the push button 70b is performed in an operating mode other than the setting mode, the system control unit 50 does not perform control so as to change the selected setting candidate. Accordingly, an erroneous operation or an erroneous setting due to a wrong operation with respect to the push button 70b can be prevented. The threshold time used in S309 is not limited to 1 second. But it is preferable for the threshold time of S309 to be shorter than the threshold time of S303. In order to distinguish between long-pressing and short-pressing, the threshold time of S309 is preferably at least 0.5 seconds and not more than 2 seconds.

In S310, the system control unit 50 causes a transition of the operating mode of the digital camera 100 to the setting mode. In other words, when a depressed state continues for 1 second or more (continues for a threshold time or more) in an operating mode in which the setting mode has been released, a transition is made to the setting mode. In addition, the system control unit 50 (i) determines which setting candidate group was assigned when the camera was last in the setting mode from information recorded in the nonvolatile memory 56, (ii) assigns the determined setting candidate group to the current candidate group, and (iii) displays a corresponding setting item on the display unit 28.

The setting candidate group assigned to the current candidate group in S310 is not limited to the previous setting candidate group (the setting candidate group having been assigned when the operating mode had previously been the setting mode). Alternatively, when a transition is made to the setting mode, the system control unit 50 may assign a predetermined setting candidate group determined in advance to the current candidate group regardless of the previous setting candidate group. Accordingly, regardless of the previous current candidate group, a predetermined setting candidate group can always be promptly (initially) made the current candidate group from an operating mode in which the setting mode has been released and a selectable candidate of the predetermined setting candidate group can be swiftly selected. Therefore, a frequently-used setting candidate group or a setting candidate group that requires immediacy may be set as the predetermined setting candidate group. In addition, when the depression time T2 is equal to or longer than a threshold time that is longer than the threshold time of S309 (for example, when the depression time T2 reaches 3 seconds), the system control unit 50 may assign a specific setting candidate group to the current candidate group. Accordingly, even when the current candidate group is another setting candidate group, the current candidate group can be promptly reset to a predetermined frequently-used setting candidate group by a simple operation of long-pressing the push button 70b for 3 seconds. While details will be provided later, in the present embodiment, when long-pressing of the push button 70b is performed in the setting mode, the system control unit 50 switches a setting candidate group to be assigned to the current candidate group in accordance with a candidate group order (a predetermined switching order). The predetermined setting candidate group is, for example, the first setting candidate group in the candidate group order. While the threshold time described above which is longer than the threshold time of S309 is not particularly limited, the threshold time is preferably somewhat long to enable the setting candidate group to be assigned to the current candidate group to be readily switched between the predetermined setting candidate group and the previous setting candidate group. The threshold time described above which is longer than the threshold time of S309 is, for example, preferably longer than 2 seconds and, specifically, is 3 seconds.

In S311, the system control unit 50 selects any of the plurality of setting candidates included in the setting candidate group (setting item) displayed in S310. It will be appreciated that the displayed setting candidate group in S310 has been assigned to the current candidate group and, as explained above, this setting candidate group may, in some examples, be the previously used setting candidate group). The selected setting candidate is then displayed on the display unit 28 in an identifiable manner. For example, a setting candidate having been set prior to the depression of the push button 70b may be selected for display. Accordingly, since the selection of the setting candidate is not changed by initial long-pressing of the push button 70b in an operating mode in which the setting mode has been released, and only a confirmation of the setting can be performed, erroneous setting changes can be prevented. Alternatively, a setting item that is not set may be selected. In this case, the selected setting candidate may be promptly automatically set or may be set in accordance with a setting operation.

On the other hand, in the setting mode, in S312, the system control unit 50 determines whether or not the depression of the push button 70b has been released. When it is determined that the depression of the push button 70b has been released (an end of an operation of the push button 70b), the system control unit 50 advances to S313, but otherwise the system control unit 50 stands by.

In S313, the system control unit 50 determines whether or not the depression time T2 is 1 second or more or, in other words, whether or not the depression of the push button 70b is long-pressing. When it is determined that the depression time T2 is 1 second or more (long-pressing of the push button 70b), the system control unit 50 advances to S314, but otherwise the system control unit 50 advances to S317. The threshold time used in S313 is not limited to 1 second. In a similar manner to the threshold time of S309, the threshold time of S313 is preferably shorter than the threshold time of S303. In order to distinguish between long-pressing and short-pressing, the threshold time of S313 is preferably at least 0.5 seconds and not more than 2 seconds. The threshold time of S313 may be equal to or may differ from the threshold time of S309.

In S314, the system control unit 50 switches a setting candidate group to be assigned to the current candidate group in accordance with the candidate group order. In other words, when the depressed state continues for 1 second or more (continues for a threshold time or more) in a state where a given setting candidate group is assigned to the current candidate group, the state of the digital camera 100 is changed to a state where a next setting candidate group in the candidate group order is assigned to the current candidate group. In addition, the system control unit 50 changes the setting item displayed on the display unit 28 to a setting item corresponding to the newly selected setting candidate group.

Alternatively, in S314, when the depression time T2 reaches a second threshold time that is longer than the threshold time (a first threshold time) of S313, the system control unit 50 may assign the predetermined setting candidate group described earlier to the current candidate group regardless of a candidate group order of the present current candidate group. While the second threshold time is not particularly limited, the second threshold time is preferably somewhat long so as to enable the setting candidate group to be assigned to the current candidate group to be readily switched between the predetermined setting candidate group and a setting candidate group in accordance with the candidate group order. The second threshold time is, for example, preferably longer than 2 seconds and, ideally, 3 seconds. In this case, the system control unit 50 assigns a setting candidate group in accordance with the candidate group order to the current candidate group when the depression time T2 is at least the first threshold time and less than the second threshold time.

In S315, the system control unit 50 records information related to the current candidate group (the setting candidate group after the switch of S314) into the nonvolatile memory 56.

In S316, the system control unit 50 selects any of the plurality of setting candidates included in the current candidate group (the setting candidate group after the switch of S314) and updates the display of the setting candidate on the display unit 28 to a display in which the selected setting candidate is identifiable. For example, a previously selected setting candidate may be selected and displayed. Alternatively, a setting candidate that is not set may be selected and displayed. In this case, the selected setting candidate may be promptly automatically set or may be set in accordance with a setting operation.

In S317, the system control unit 50 changes the selected setting candidate to any of the plurality of setting candidates included in the setting candidate group which has been assigned to the current candidate group. In other words, when short-pressing (depression of shorter than 1 second) of the push button 70*b* is performed in the setting mode, the system control unit 50 changes the selected setting candidate to any of the plurality of setting candidates included in the setting candidate group which has been assigned to the current candidate group. In the present embodiment, the system control unit 50 switches the selected setting candidate in accordance with a candidate order (a predetermined switching order).

In S318, the system control unit 50 updates the display of the setting candidate on the display unit 28 to a display that reflects the change (switch) of S317.

Figure 4:
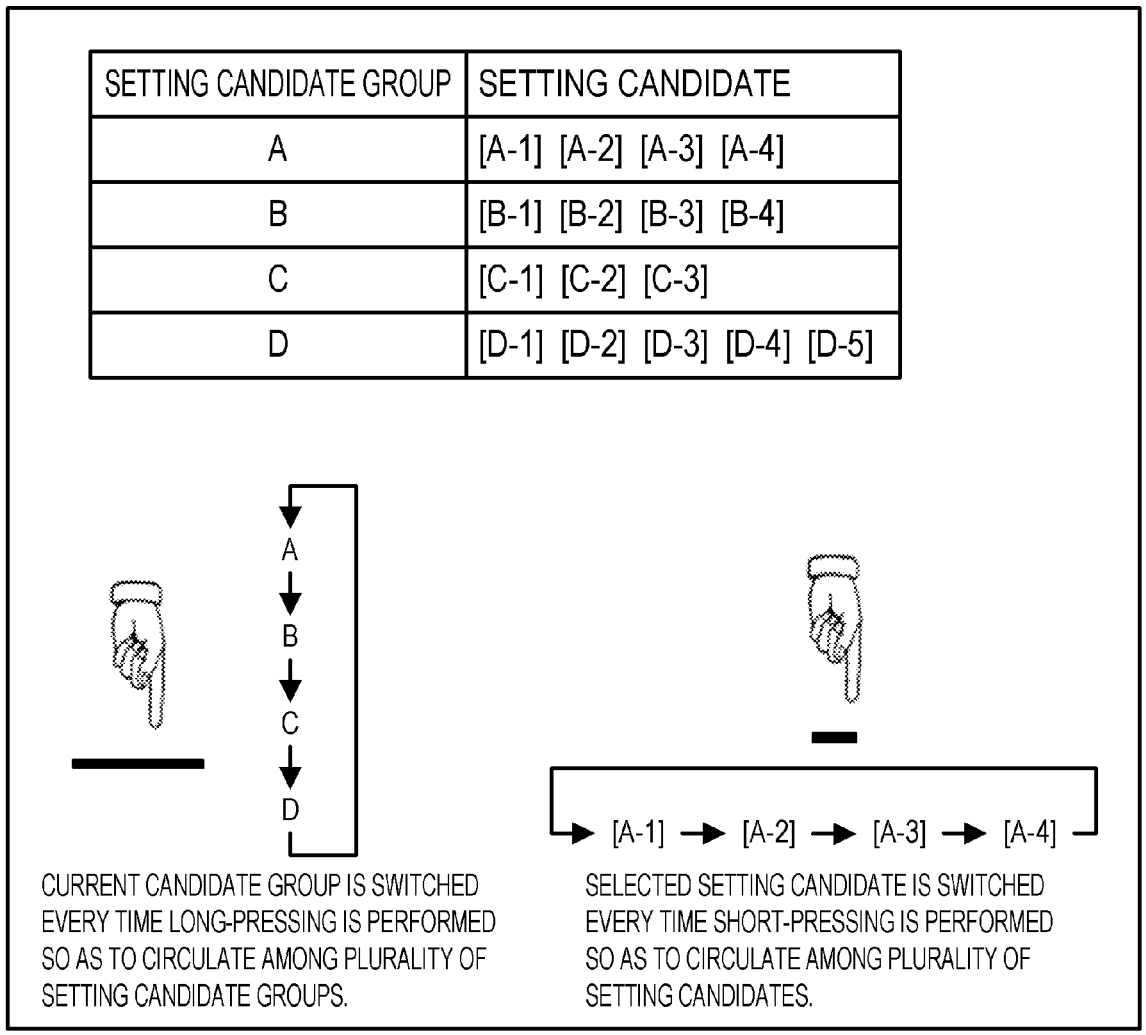
FIG. 4 shows an example of switching of setting candidate groups and setting candidates according to the present embodiment.

A specific example of operation processing will be described with reference to FIGS. 4 and 5. FIG. 4 shows setting candidate groups having different sets of setting candidates. These setting candidate groups can be assigned to an current candidate group in accordance with the embodiments herein. The setting candidates of each setting candidate group may also be selected in accordance with embodiments herein. It will be appreciated that the camera is configured to use the selected setting candidates and, thus, changing the selection of the setting candidates in each setting candidate group allows a user to configure the camera in accordance with the user's preference. Also, grouping the setting candidates into different groups and controlling the selection of the setting candidates in the different groups via a single button provides an efficient way of configuring multiple settings with a single button. In the example shown in FIG. 4, there are four setting candidate groups: A, B, C, and D. The setting candidate group A includes four setting candidates [A-1], [A-2], [A-3], and [A-4], and the setting candidate group B includes four setting candidates [B-1], [B-2], [B-3], and [B-4]. The setting candidate group C includes three setting candidates [C-1], [C-2], and [C-3], and the setting candidate group D includes five setting candidates [D-1], [D-2], [D-3], [D-4], and [D-5]. When the setting candidate group A is related to a setting item "ISO sensitivity", for example, the setting candidates [A-1], [A-2], [A-3], and [A-4] respectively represent setting values [AUTO], [100], [400], and [800]. When the setting candidate group B is related to a setting item "shutter speed", for example, the setting candidates [B-1], [B-2], [B-3], and [B-4] respectively represent setting values [AUTO], [⅕ seconds], [ 1/30 seconds], and [ 1/60 seconds]. When the setting candidate group C is related to a setting item "self-timer", for example, the setting candidates [C-1], [C-2], and [C-3] respectively represent setting values [off], [2 seconds], and [10 seconds]. When the setting candidate group D is related to a setting item "image quality", for example, the setting candidates [D-1], [D-2], [D-3], [D-4], and [D-5] respectively represent setting values [L (4000× 3000 pixels)], [M1 (3000×2000 pixels)], [M2 (1920×1080 pixels)], [S1 (1280×720 pixels)], and [L2 (640×480 pixels)].

In the setting mode, when long-pressing of the push button 70*b* is performed in a state where the setting candidate group A is assigned to the current candidate group, the current candidate group is switched from the setting candidate group A to the setting candidate group B. When long-pressing of the push button 70*b* is performed in a state where the setting candidate group B is assigned to the current candidate group, the current candidate group is switched from the setting candidate group B to the setting candidate group C. When long-pressing of the push button 70*b* is performed in a state where the setting candidate group C is assigned to the current candidate group, the current candidate group is switched from the setting candidate group C to the setting candidate group D. In addition, when long-pressing of the push button 70*b* is performed in a state where the setting candidate group D is assigned to the current candidate group, the current candidate group is switched from the setting candidate group D to the setting candidate group A. In this manner, the current candidate group is switched every time long-pressing of the push button 70*b* is performed so as to circulate among the setting candidate groups A, B, C, and D. In this example, setting candidate group A is the first setting candidate group in the switching order.

In addition, when the setting candidate group A is assigned to the current candidate group in the setting mode, and short-pressing of the push button 70*b* is performed in a state where setting candidate [A-1] is selected, the selected setting candidate is switched from setting candidate [A-1] to setting candidate [A-2]. When short-pressing of the push button 70*b* is performed in a state where setting candidate [A-2] is selected, the selected setting candidate is switched from setting candidate [A-2] to setting candidate [A-3]. When short-pressing of the push button 70*b* is performed in a state where setting candidate [A-3] is selected, the selected setting candidate is switched from setting candidate [A-3] to setting candidate [A-4]. In addition, when short-pressing of the push button 70*b* is performed in a state where setting candidate [A-4] is selected, the selected setting candidate is switched from setting candidate [A-4] to setting candidate [A-1]. In this manner, in a state where the setting candidate group A is assigned to the current candidate group, the selected setting candidate is switched every time short-pressing of the push button 70*b* is performed so as to circulate among the setting candidates [A-1], [A-2], [A-3], and [A-4]. In a similar manner, when the setting candidate groups B, C, and D are assigned to the current candidate group, the selected setting candidate is switched every time short-pressing of the push button 70*b* is performed so as to circulate among the plurality of setting candidates included in the setting candidate group that is assigned to the current candidate group—e.g. repeatedly short-pressing push button 70b circulates through setting candidates [B-1] to [B-4] when setting candidate group B is assigned to the current candidate group.

Figure 5:
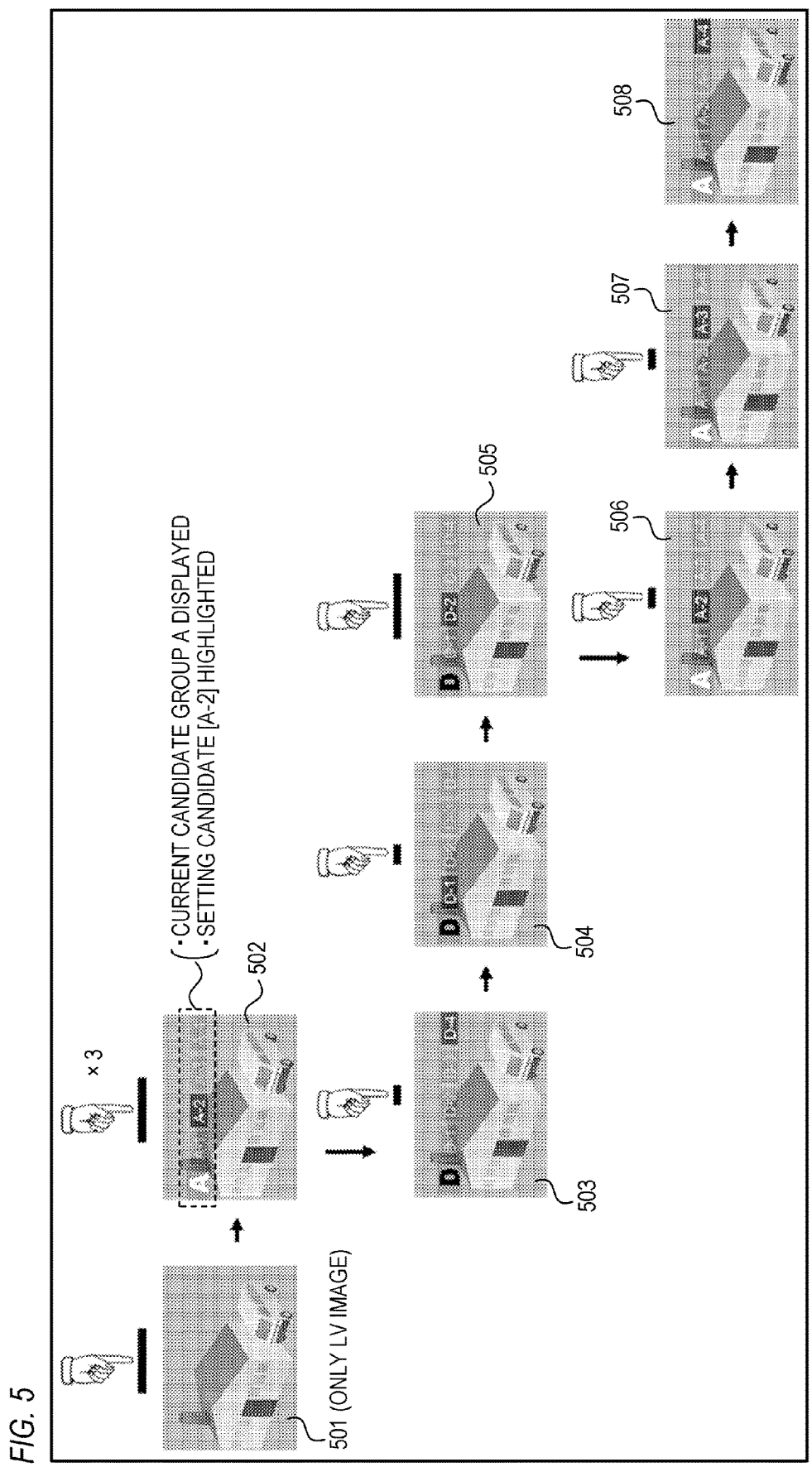
FIG. 5 shows a screen example of the digital camera according to the present embodiment.

FIG. 5 shows a specific example of a display of the display unit 28. A screen 501 shown in FIG. 5 is a screen displayed by the display unit 28 in the photography mode and includes an LV image (a live image). When long-pressing of the push button 70b is performed in a state where the screen 501 is displayed, the operating mode of the digital camera 100 makes a transition to the setting mode and the screen displayed on the display unit 28 is switched to a screen 502 (cf. S310 and S311 in FIG. 3). The screen 502 illustrates what may be displayed when setting candidate group A is assigned to the current candidate group and, at the same time, the setting candidate [A-2] is set and selected. Thus, on screen 502, setting candidate group A is shown and the setting candidate [A-2] is highlighted. The current candidate group and the selected setting candidate are preferably superimposed on the LV image.

Figure 3:
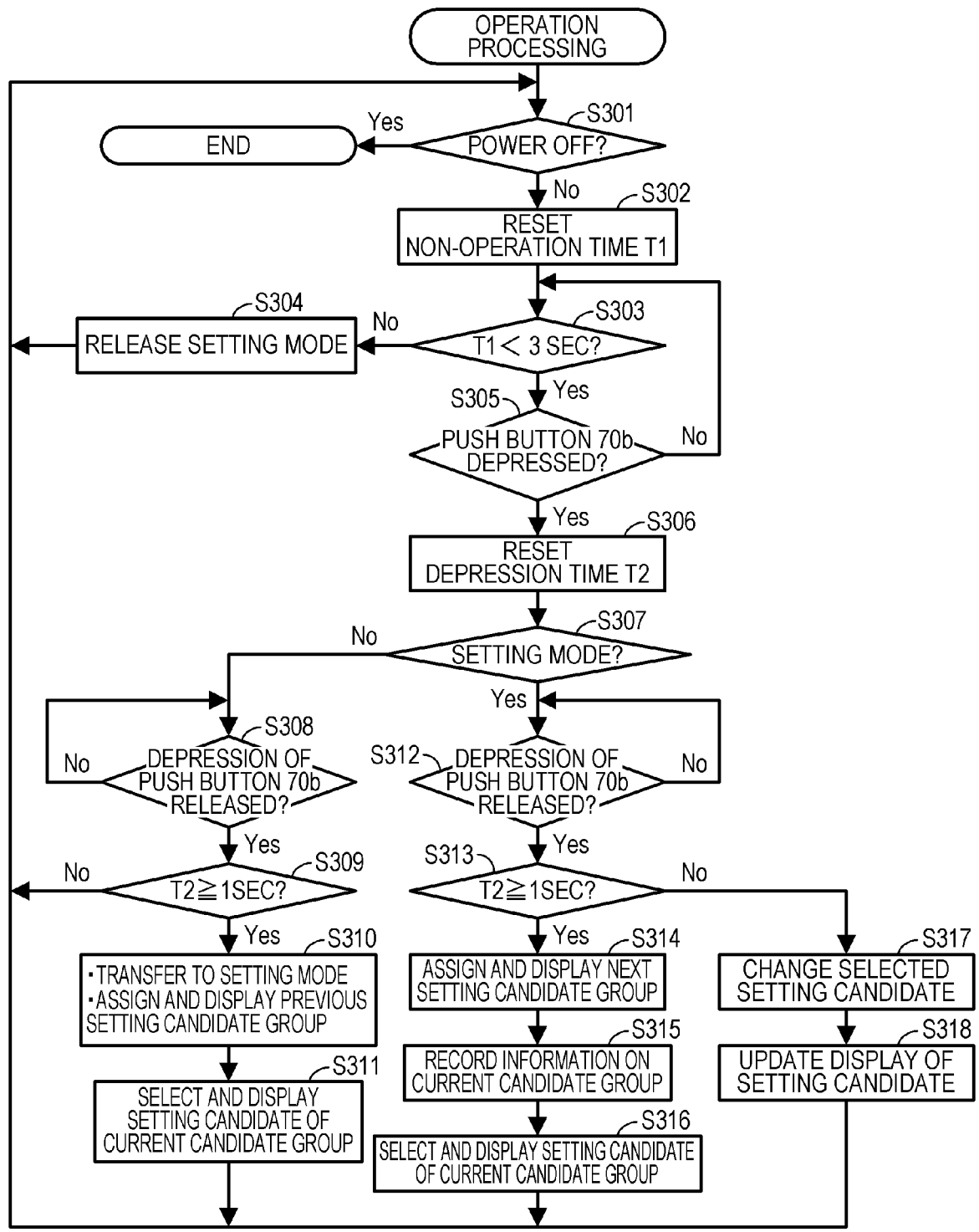
FIG. 3 is a flow chart of the digital camera according to the present embodiment.

When long-pressing of the push button 70b is performed three times in a state where the screen 502 is displayed, the current candidate group is changed to setting candidate group D and, accordingly, the screen displayed on the display unit 28 is switched to a screen 503 (cf. S314 and S316 in FIG. 3). The screen 503 is a screen when the setting candidate [D-4] is set and selected. Thus, on the screen 503, setting candidate group D is shown to be selected (i.e. thereby indicating that it is assigned to the current candidate group) and setting candidate [D-4] is highlighted (thereby indicating that [D-4] is currently being selected).

When a single short-press of the push button 70b is performed in a state where the screen 503 is displayed, the selected setting candidate is changed to setting candidate [D-1] and, accordingly, the screen displayed on the display unit 28 is switched to a screen 504 (cf. S317 and S318 in FIG. 3). On the screen 504, setting candidate group D and setting candidate [D-1] are shown as being selected. At this point, the setting candidate [D-1] may or may not be automatically set for use by the camera 100. In a similar manner, when a single short-press of the push button 70b is performed in a state where the screen 504 is displayed, the selected setting candidate is changed to the setting candidate [D-2] and the screen displayed on the display unit 28 is switched to a screen 505. On the screen 505, setting candidate group D and setting candidate [D-2] are shown as being selected.

When a single long-press of the push button 70b is performed in a state where the screen 505 is displayed, the current candidate group is changed to the setting candidate group A and the screen displayed on the display unit 28 is switched to a screen 506 (S314 and S316 in FIG. 3). In this case, since short-pressing of the push button 70b or the like has not been performed in a state where the screen 502 is displayed, a state where the setting candidate [A-2] has been set is maintained—that is, since the setting candidate was not changed when setting candidate group A was assigned to the current candidate group at screen 502, the camera 100 maintains the selection of setting candidate [A-2]. Therefore, on the screen 506, setting candidate group A and the setting candidate [A-2] are selected.

When a single short-press of the push button 70b is performed in a state where the screen 506 is displayed, the selected setting candidate is changed to the setting candidate [A-3] and the screen displayed on the display unit 28 is switched to a screen 507 (S317 and S318 in FIG. 3). On the screen 507, setting candidate group A and the setting candidate [A-3] are shown as being selected. At this point, the setting candidate [A-3] may or may not be automatically set. In a similar manner, when short-pressing of the push button 70b is performed in a state where the screen 507 is displayed, the selected setting candidate is changed to the setting candidate [A-4] and the screen displayed on the display unit 28 is switched to a screen 508. On the screen 508, setting candidate group A is shown and setting candidate [A-4] are highlighted.

As described above, according to the present embodiment, the assignment of the current candidate group can be switched to another setting candidate group by depressing one operating member (e.g. push button 70b). Similarly, the selection of a setting candidate can be switched to another setting candidate solely by depressing the same operating member (e.g. push button 70b). Accordingly, a larger amount of information can be selected solely by depressing one operating member.

It should be noted that the various controls described above are preferably performed by the system control unit 50, for example, using one piece of hardware or a plurality of pieces of hardware (for example, a plurality of processors or circuits) that are configured to control the entire apparatus by sharing processes.

In addition, while the present invention has been described in detail based on a preferred embodiment thereof, the present invention is not limited to the specific embodiment and various modes without departing from the scope of the invention are also included in the present invention. Furthermore, the embodiment described above simply represents an example of the present invention and the embodiment can also be combined with other embodiments.

Figure 6:
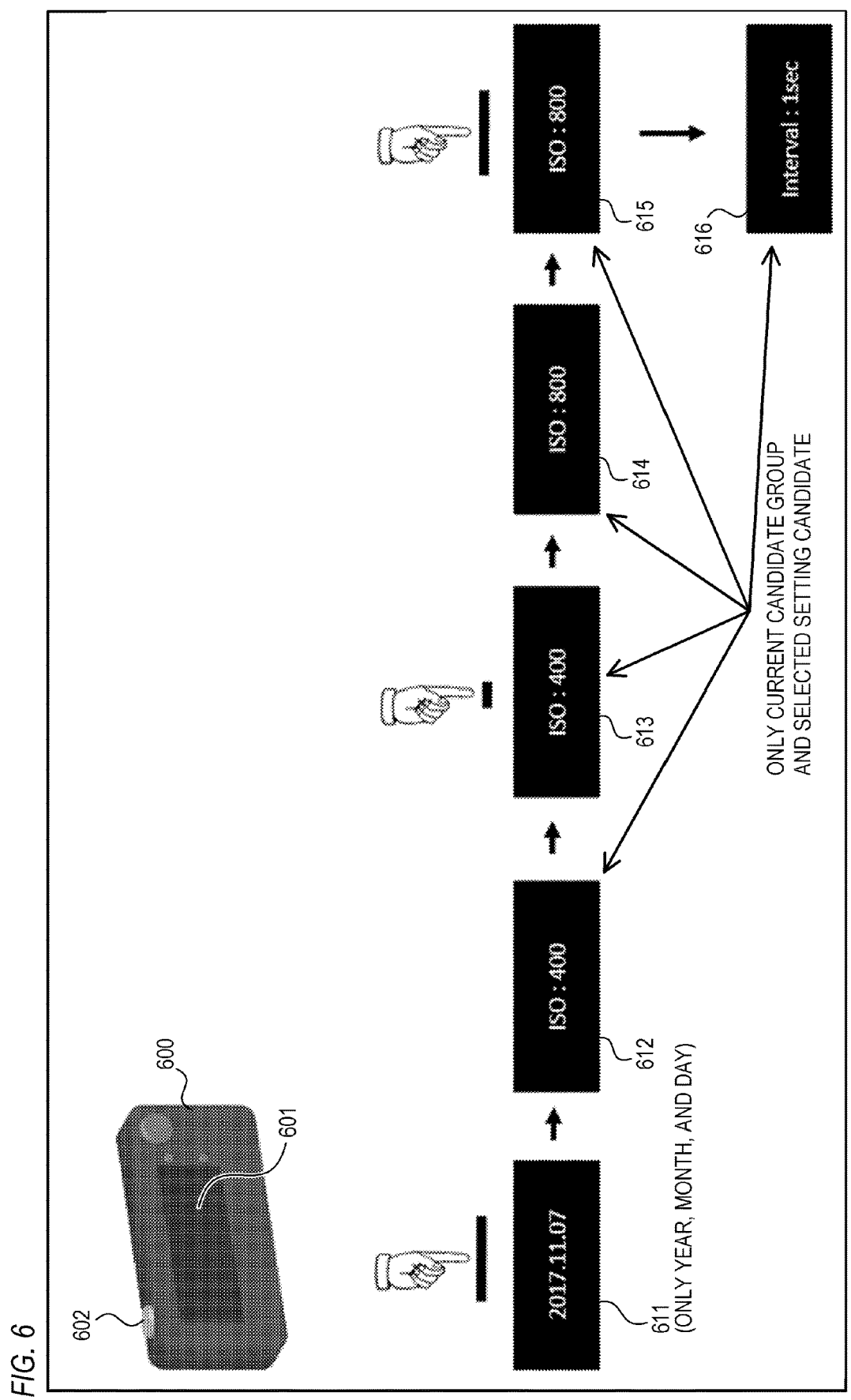
FIG. 6 shows a screen example of another electronic device according to the present embodiment.
Figure 7:
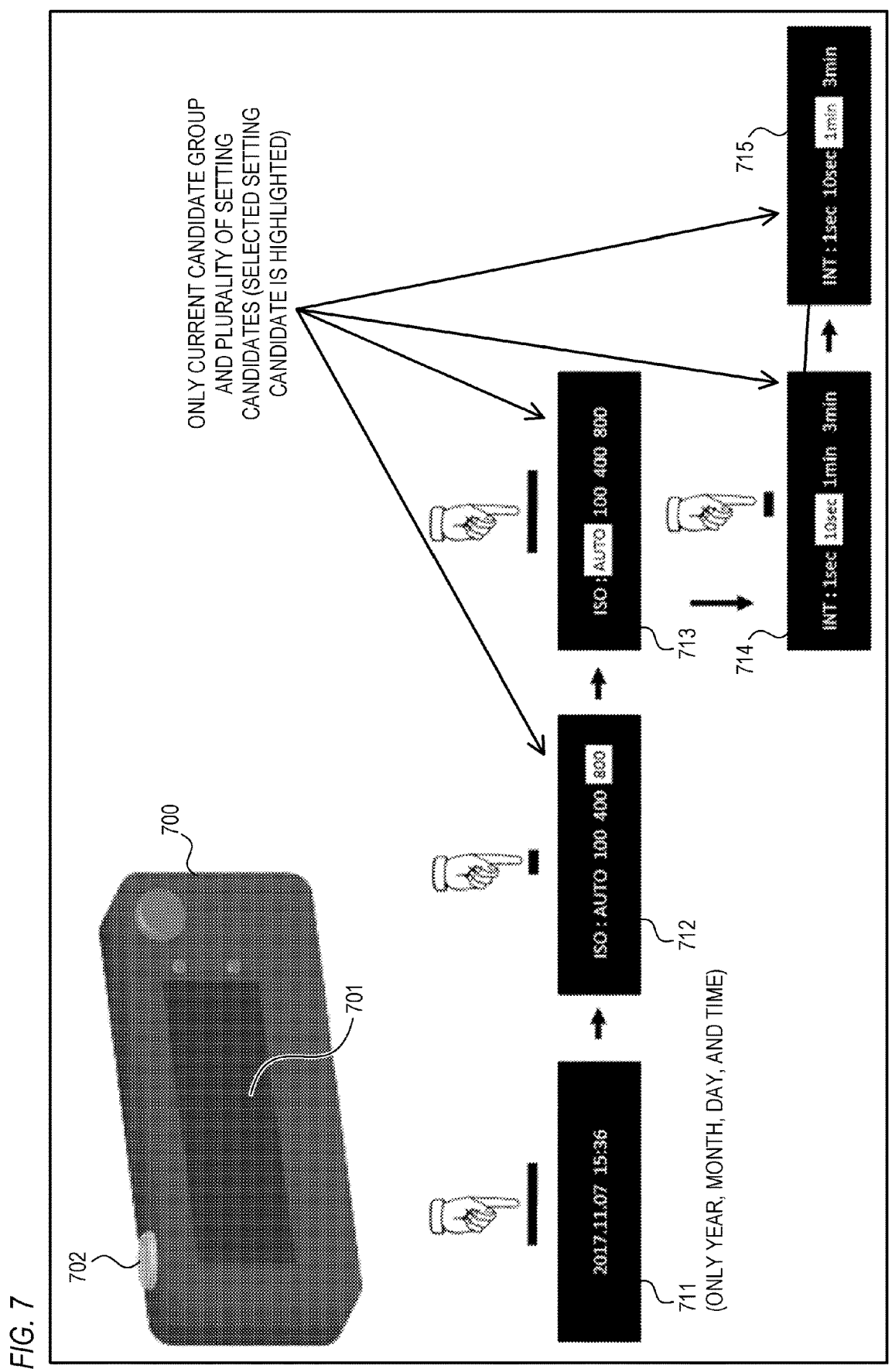
FIG. 7 shows a screen example of another electronic device according to the present embodiment.

For example, as shown in FIGS. 6 and 7, the present invention may be applied to electronic devices 600 and 700 with fewer operating members and smaller display surfaces than the digital camera 100. The electronic devices 600 and 700 have simpler displays than the digital camera 100.

As shown in FIG. 6, electronic device 600 has a display surface 601. The system control unit of electronic device 600 may display on display surface 601 screen 611 (a screen in a default mode) showing the date (e.g. year, month, and day). In a setting mode, the system control unit may also display on display surface 601 screens 612 to 616. Screens 612 to 616 only show the current candidate group and a selected setting item. The screens 611 to 616 do not include an LV image. As shown in FIG. 6, a plurality of screens 611-616 may be displayed on display surface 601, and the electronic device 600 can be switched to display a different screen among a plurality of screens including the screens 611 to 616 by long-pressing or short-pressing a button 602 in a similar manner to the digital camera 100. The example shown in FIG. 6 is an example in which a setting candidate group A represents year, month, and day settings, a setting candidate group B represents ISO sensitivity, and a setting candidate group C represents interval photography setting items.

As shown in FIG. 7, electronic device 700 has a display surface 701. The system control unit of electronic device 700 may display on display surface 701 a screen 711 showing the year, month, day, and time. The electronic device may also display other types of screens on its display surface such as screens 712 to 715. Screens 712 to 715 only show the setting candidate group which has been assigned to the current candidate group, together with the plurality of setting items included in the setting candidate group. Screen 711 is a screen in a default mode and the screens 712 to 715 are screens in a setting mode. The screens 712 to 715 do not include an LV image but show a selected setting item being highlighted. As shown in FIG. 7, the electronic device 700 can switch between screens 711 to 715 in response to long-pressing or short-pressing of a button 702 in a similar manner to the digital camera 100. The example shown in FIG. 7 is also an example in which: a setting candidate group A represents year, month, and day settings; a setting candidate group B represents ISO sensitivity; and a setting candidate group C represents interval photography setting items.

The present invention can also be applied to electronic devices not equipped with a display unit, a function of controlling display of a display unit, and the like. In addition, a notification of contents of an operation can also be realized by output of sound from a speaker, blinking of a light-emitting unit (such as an LED), vibration of an electronic device, and the like. For example, the system control unit 50 may notify a change to a selected setting candidate by output of a short sound and, when a setting candidate group assigned to the current candidate group is changed, notify the setting candidate group after the change by the number of output long sounds. The system control unit 50 may notify a change to a selected setting candidate by blinking of the light-emitting unit in a first color and, when a setting candidate group assigned to the current candidate group is changed, notify the setting candidate group after the change by the number of times the light-emitting unit blinks in a second color. The system control unit 50 may notify change to a selected setting candidate by a first vibration that is at least one of a weak vibration and a short vibration of the digital camera 100. In addition, when a setting candidate group assigned to the current candidate group is changed, the system control unit 50 may notify the setting candidate group after the change by the number of times a second vibration that is at least one of a strong vibration and a long vibration of the digital camera 100 is performed.

Figure 8:
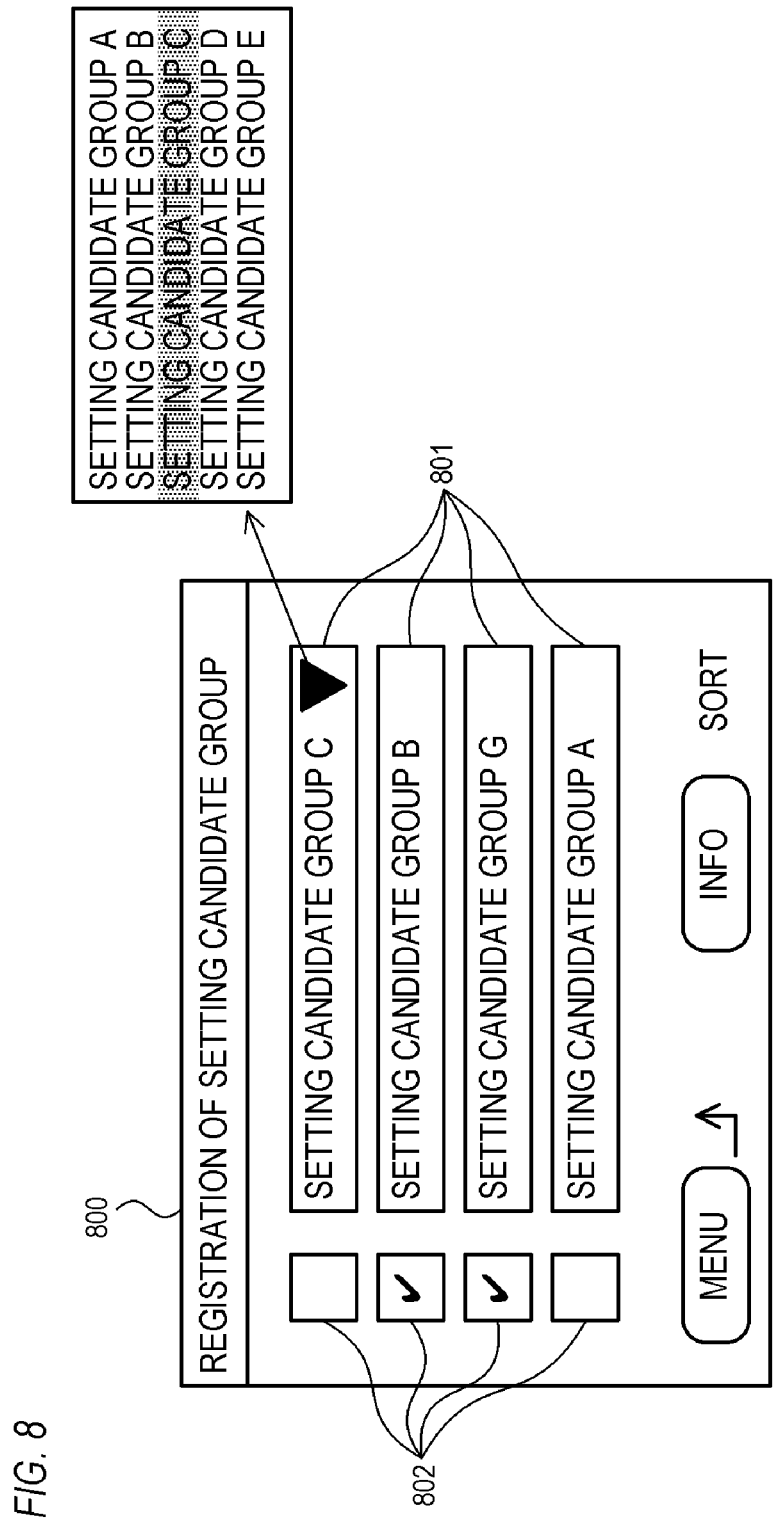
FIG. 8 shows a screen example of the digital camera according to the present embodiment.

In addition, as shown in FIG. 8, the user may be able to register at least one of a setting candidate group assignable to the current candidate group and a candidate group order. Registration (customization) of a setting candidate group or a candidate group order may be performed by an operation with respect to the digital camera 100 or by an operation with respect to an external device connected to the digital camera 100. For example, an application for registering a setting candidate group or a candidate group order may be installed on an external device and a setting candidate group or a candidate group order may be registered using the application. A screen 800 shown in FIG. 8 includes a plurality of text boxes 801 in which a setting candidate group can be entered and a plurality of check boxes 802 respectively corresponding to the plurality of text boxes 801. A setting candidate group of a text box 801 corresponding to a checked check box 802 is registered as a setting candidate group assignable to the current candidate group. Furthermore, when a plurality of setting candidate groups assignable to the current candidate group are to be registered, an order in which the setting candidate groups are described from an upper side of the screen 800 is registered as a candidate group order. For example, the user registers a descending order of frequencies of use of setting candidate groups as a candidate group order. Accordingly, in a configuration in which a setting candidate group that is first in a candidate group order can be assigned to the current candidate group regardless of the candidate group order or the like, a setting candidate group with a high frequency of use can be more readily assigned to the current candidate group and convenience improves. In a state represented by the screen 800, a setting candidate group B is registered as the setting candidate group that is first in the candidate group order and a setting candidate group G is registered as the setting candidate group that is second in the candidate group order.

In addition, when assigning a setting candidate group to the current candidate group for the first time after turning on power to the digital camera 100, a predetermined setting candidate group (such as a setting candidate group that is first in a candidate group order) may be assigned to the current candidate group. Accordingly, after power to the digital camera 100 is turned on, the user can start an operation for changing the current candidate group, changing a selected setting candidate, and the like from a state where the predetermined setting candidate group has already been assigned to the current candidate group.

In addition, the specific operating member is not limited to the push button 70b. The specific operating member may be a physical button or a GUI button displayed on the display unit 28. When the specific operating member is a GUI button, a time from touch-down to touch-up with respect to the GUI button (a position on the touch panel 70a corresponding to a display position of the GUI button) may be used as the depression time T2.

Furthermore, when the number of setting candidates included in the current candidate group is too large, the time it takes for the selected setting candidate to make a circuit around the plurality of setting candidates may increase and a longer time may be required to select a desired setting candidate. In a similar manner, when the number of setting candidate groups that can be assigned to the current candidate group is too large, the time it takes for the current candidate group to make a circuit around the plurality of setting candidate groups may increase and a longer time may be required to assign a desired setting candidate group to the current candidate group. In addition, the time required to make one change to the current candidate group (in the example shown in FIG. 3, about 3 seconds) is longer than the time required to make one change to the selected setting candidate (in the example shown in FIG. 3, about 1 second). Therefore, the number of setting candidate groups that can be assigned to the current candidate group is preferably smaller than a maximum number of setting candidates that can be included in one setting candidate group. Specifically, the number of setting candidates respectively included in a setting candidate group that can be assigned as the current candidate group is preferably ten or smaller in any selectable candidate group. Furthermore, the number of selectable candidate groups that can be assigned as the current candidate group is preferably five or smaller.

In addition, each of a plurality of setting candidate groups may or may not be related to a plurality of setting items. For example, a plurality of setting candidates related to one setting item may be divided into two or more setting candidate groups. A selectable candidate group need not be a setting candidate group. In other words, candidates included in a selectable candidate group need not be setting candidates to be set. For example, the present invention is also applicable to a phone book application. In this case, each contact may be used as a candidate. In addition, contacts of a plurality of persons whose names start with a same alphabet may be used as one selectable candidate group. For example, contacts of a plurality of persons whose names start with "A" may be used as a first selectable candidate group and contacts of a plurality of persons whose names start with "B" may be used as a second selectable candidate group. Accordingly, selection of a first letter of a name, selection of a contact (person), and the like can be readily performed. A person is selected from candidates included in each selectable candidate, a contact of the selected person is displayed, and is set as a telephone number, an e-mail address, or the like. Then, when a communication such as a calling, a mailing, or the like is performed, the communication is performed to the contact of the person selected from the candidates included in each selectable candidate. In a similar manner, the present invention is also applicable to a music reproduction application. For example, each music album may be used as each selectable candidate group, and a plurality of music included in each music album may be used as a plurality of candidates included in each selectable candidate group. When any one of the plurality of candidates (the plurality of music) included in the current candidate group (the music album) is selected, the selected music is audio-outputted from a speaker, or an audio-output device connected via an audio-output terminal or wirelessly. Furthermore, the present invention can also be applied to character input. For example, the present invention can be applied by using the alphabets A to Z as a setting candidate group A, the numerals 0 to 9 as a setting candidate group B, and symbols such as a comma, a period, and an apostrophe as a setting candidate group C. Since including the alphabets A to Z in a same candidate group results in an excessive number of candidates, the alphabets A to Z may be divided into groups of a predetermined number of (for example, five) characters so that the setting candidate group A includes A to E, the setting candidate group B includes F to J, and so on. Alternatively, the alphabets A to Z may be divided so that the setting candidate group A includes consonants and the setting candidate group B includes vowels.

Furthermore, while an example in which the present invention is applied to a digital camera (an imaging device) has been described in the embodiment presented above, the present invention is not limited to this example and can be applied to any electronic device capable of accepting user operations. For example, the present invention can be applied to a personal computer, a PDA, a mobile phone terminal, a mobile image viewer, a printer apparatus, a digital photo frame, a music player, a game device, an electronic book reader, a video player, a display apparatus (including a projection apparatus), a tablet terminal, a smartphone, an AI speaker, a home electrical appliance, a vehicle-mounted apparatus, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-050668, filed on Mar. 19, 2018, which is hereby incorporated by reference herein in its entirety.

What is claimed is:

1. An electronic device comprising a memory and at least one processor which function as a control unit configured to perform control to:
   display at least selected candidate on a display unit;
   in a first state where a first selectable candidate group is assigned to a current candidate group, switch from selecting a first candidate of the first candidate group to selecting a second candidate of the first candidate group in response to a first type operation of pushing a physical operating button, wherein the first type operation is an operation which finishes before a first time period after the operation starts;
   in the first state, change from the first state to a second state, where a second selectable candidate group is assigned to the current candidate group, in response to a second type operation of pushing the physical operating button continuing for the first time period or more;
   in the second state, switch from selecting a first candidate of the second candidate group to selecting a second candidate of the second candidate group in response to the first type operation of the same physical operating button;
   wherein the first type operation is a short-press of the physical operating button and the second type operation is a long-press of the physical operation button;
   in a first operating mode as a candidate selection mode, the control unit performs control to switch selecting the first candidate of the current candidate group to selecting the second candidate of the current candidate group in response to the first type operation of the physical operating button; and
   in a second operating mode, the control unit does not perform control to switch selecting the first candidate of the current candidate group to selecting the second candidate of the current candidate group in response to the first type operation of the physical operating button.

2. The electronic device according to claim 1, wherein
   the control unit changes the current candidate group to any one of a plurality of selectable candidate groups in response to the second type operation of the physical operating button, the plurality of selectable candidate groups includes the first selectable candidate group and the second selectable candidate group, and each of the plurality of selectable candidate groups includes a plurality of selectable candidates.

3. The electronic device according to claim 1, wherein each of the first candidate and the second candidate is a setting candidate, and each of selecting the first candidate and selecting the second candidate is setting the setting candidate.

4. The electronic device according to claim 2, wherein the first selectable candidate group is a setting candidate group related to a first setting item, and the second selectable candidate group is a setting candidate group related to a second setting item.

5. The electronic device according to claim 1, wherein in the second operating mode, the control unit performs control to transfer to the first operating mode in response to a third type operation of pushing the physical operating button continuing for a second time period or more.

6. The electronic device according to claim 5, wherein the second time period is equal to the first time period.

7. The electronic device according to claim 1, wherein in the first operating mode, when a state where an operation with respect to the electronic device is not performed continues for a third time period, the control unit performs control to transfer to the second operating mode.

8. The electronic device according to claim 7, wherein the first time period is shorter than the third time period.

9. The electronic device according to claim 7, wherein the first time period is 0.5 seconds, 2 seconds or any time between 0.5 seconds and 2 seconds; and the third time period is more than 2 seconds.

10. The electronic device according to claim 1, wherein when there is a transition to the first operating mode, the control unit performs control to assign, to the current candidate group, a selectable candidate group assigned during a previous first operating mode.

11. The electronic device according to claim 1, wherein when there is a transition to the first operating mode, the control unit performs control to assign the first selectable candidate group to the current candidate group.

12. The electronic device according to claim 1, wherein the control unit performs control to:

change the assignment of the current candidate group in accordance with a predetermined changing order in response to the second type operation of the physical operating button, wherein the second type operation is an operation which finishes with a time period, which is the first time period or more and shorter than a fourth time period, after the operation starts; and assign the first selectable candidate group to the current candidate group regardless of the predetermined changing order in response to a fourth type operation of the physical operating button continuing for the fourth time period or more.

13. The electronic device according to claim 11, wherein the control unit performs control to changing the assignment of the current candidate group in accordance with a predetermined changing order in response to the second type operation of the physical operating button, and the first delectable candidate group is a leading selectable candidate group in the predetermined changing order.

14. The electronic device according to claim 1, wherein the control unit further performs control to display, on the display unit, a selectable candidate group to be assigned to the current candidate group.

15. The electronic device according to claim 1, wherein the number of selectable candidate groups is less than a number of selectable candidates that are included in a selectable candidate group which includes the largest number of selectable candidates among the selectable candidate groups.

16. The electronic device according to claim 1, wherein the number of selectable candidates included in each of selectable candidate groups is ten or less in any selectable candidate group.

17. The electronic device according to claim 1, wherein the number of selectable candidate groups is five or less.

18. The electronic device according to claim 1, wherein the control unit further performs control to register, in response to a user's request, at least one (i) selecting candidate groups and (ii) a changing order in accordance with which the assignment of the current candidate group is to be changed in response to the second type operation of the physical operating button.

19. The electronic device according to claim 1, wherein the control unit further performs control to:

issue a command to output a short sound in response to a switching in the selection of a selectable candidate, and in response to a change in the assignment of the current candidate group, issue a command to output a long sound relative to the short sound a times according to the current candidate group after the change.

20. The electronic device according to claim 1, wherein the control unit further performs control to:

issue a command to blink a light-emitting unit in a first color in response to a change in the selection of a selectable candidate, and in response to a change in the assignment of the current candidate group, issue a command to blink a light-emitting unit in a second color a times according to the current candidate group after the change.

21. The electronic device according to claim 1, wherein the control unit further performs control to:

issue a command to vibrate the electronic device using a first vibration that is at least one of a weak vibration and a short vibration in response to a switching in the selection of a selectable candidate, and in response to a change in the assignment of the current candidate group, issue a command to vibrate the electronic device using a second vibration that is at least one of a strong vibration and a long vibration a times according to the current candidate group after the change.

22. The electronic device according to claim 1, wherein the control unit further performs control to execute processing corresponding to the selected candidate switched by the first type operation.

23. The electronic device according to claims 22, wherein the processing corresponding to the selected candidate switched by the first type operation is at least one of a shooting processing by an image capturing device corresponding to the selected candidate, a display processing indicating the selected candidate, a communication processing corresponding to the selected candidate, an audio output processing corresponding to the selected candidate, and a character input processing corresponding to the selected candidate.

24. A control method of an electronic device, comprising:
displaying at least selected candidate on a display unit;
in a first state where a first selectable candidate group is assigned to a current candidate group, switching from selecting a first candidate of the first candidate group to selecting a second candidate of the first candidate group in response to a first type operation of pushing a physical operating button, wherein the first type operation is an operation which finishes before a first time period after the operation starts;
in the first state, changing from the first state to a second state, where a second selectable candidate group is assigned to the current candidate group, in response to a second type operation of pushing the physical operating button continuing for the first time period or more;
in the second state, switching from selecting a first candidate of the second candidate group to selecting a second candidate of the second candidate group in response to the first type operation of the same physical operating button;
wherein the first type operation is a short-press of the physical operating button and the second type operation is a long-press of the physical operation button;
in a first operating mode as a candidate selection mode, selecting the first candidate of the current candidate group is switched to selecting the second candidate of the current candidate group in response to the first type operation of the physical operating button; and
in a second operating mode, selecting the first candidate of the current candidate group is not switched to selecting the second candidate of the current candidate group in response to the first type operation of the physical operating button.

25. A non-transitory computer readable medium that stores a program, wherein the program causes a computer to execute:
displaying at least selected candidate on a display unit;
in a first state where a first selectable candidate group is assigned to a current candidate group, switching from selecting a first candidate of the first candidate group to selecting a second candidate of the first candidate group in response to a first type operation of pushing a physical operating button, wherein the first type operation is an operation which finishes before a first time period after the operation starts;
in the first state, changing from the first state to a second state, where a second selectable candidate group is assigned to the current candidate group, in response to a second type operation of pushing the physical operating button continuing for the first time period or more;
in the second state, switching from selecting a first candidate of the second candidate group to selecting a second candidate of the second candidate group in response to the first type operation of the same physical operating button;
wherein the first type operation is a short-press of the physical operating button and the second type operation is a long-press of the physical operation button;
in a first operating mode as a candidate selection mode, selecting the first candidate of the current candidate group is switched to selecting the second candidate of the current candidate group in response to the first type operation of the physical operating button; and
in a second operating mode, selecting the first candidate of the current candidate group is not switched to selecting the second candidate of the current candidate group in response to the first type operation of the physical operating button.

26. An electronic device comprising a memory and at least one processor which function as a control unit configured to perform control to:
display at least selected candidate on a display unit;
in a first state where a first selectable candidate group relating to shooting processing by an image capturing device is assigned to a current candidate group, switch from selecting a first candidate of the first candidate group to selecting a second candidate of the first candidate group in response to a first type operation of pushing a physical operating button , wherein the first type operation is an operation which finishes before a first time period after the operation starts;
in the first state, change from the first state to a second state, where a second selectable candidate group relating to shooting processing by an image capturing device is assigned to the current candidate group, in response to a second type operation of pushing the physical operating button continuing for the first time period or more;
in the second state, switch from selecting a first candidate of the second candidate group to selecting a second candidate of the second candidate group in response to the first type operation of the same physical operating button;
wherein the first type operation is a short-press of the physical operating button and the second type operation is a long-press of the physical operation button.

27. The electronic device according to claim 26, wherein
the first candidate group is a candidate group for setting a value of an item which is any one of ISO sensitivity, shutter speed, self-timer, and image size in the shooting processing by the image capturing device; and
the second candidate group is a candidate group for setting a value of an item which is different from the item of the first candidate group, among the ISO sensitivity, the shutter speed, the self-timer, and the image size in the shooting processing by the image capturing device.

28. The electronic device according to claim 26, wherein
in a first operating mode as a candidate selection mode, the control unit performs control to switch selecting the first candidate of the current candidate group to selecting the second candidate of the current candidate group in response to the first type operation of the specific physical operating member button; and
in a second operating mode, the control unit does not perform control to switch selecting the first candidate of the current candidate group to selecting the second candidate of the current candidate group in response to the first type operation of the specific physical operating member button.

29. The electronic device according to claim 28, wherein
in the second operating mode, the control unit performs control to transfer to the first operating mode in response to a third type operation of pushing the physical operating button continuing for a second time period or more.

30. The electronic device according to claim 28, wherein in the first operating mode, when a state where an operation with respect to the electronic device is not performed continues for a third time period, the control unit performs control to transfer to the second operating mode.

31. The electronic device according to claim 26, wherein a candidate group assigned to the current candidate group is displayed on the display unit.

32. A control method of an electronic device, comprising:
displaying at least selected candidate on a display unit;
in a first state where a first selectable candidate group relating to shooting processing by an image capturing device is assigned to a current candidate group, switching from selecting a first candidate of the first candidate group to selecting a second candidate of the first candidate group in response to a first type operation of pushing a physical operating button, wherein the first type operation is an operation which finishes before a first time period after the operation starts;
in the first state, changing from the first state to a second state, where a second selectable candidate group relating to shooting processing by an image capturing device is assigned to the current candidate group, in response to a second type operation of pushing the physical operating button continuing for the first time period or more;
in the second state, switching from selecting a first candidate of the second candidate group to selecting a second candidate of the second candidate group in response to the first type operation of the same physical operating button;
wherein the first type operation is a short-press of the physical operating button and the second type operation is a long-press of the physical operation button.

33. A non-transitory computer readable medium that stores a program, wherein the program causes a computer to execute:
displaying at least selected candidate on a display unit;
in a first state where a first selectable candidate group relating to shooting processing by an image capturing device is assigned to a current candidate group, switching from selecting a first candidate of the first candidate group to selecting a second candidate of the first candidate group in response to a first type operation of pushing a physical operating button, wherein the first type operation is an operation which finishes before a first time period after the operation starts;
in the first state, changing from the first state to a second state, where a second selectable candidate group relating to shooting processing by an image capturing device is assigned to the current candidate group, in response to a second type operation of pushing the physical operating button continuing for the first time period or more;
in the second state, switching from selecting a first candidate of the second candidate group to selecting a second candidate of the second candidate group in response to the first type operation of the same physical operating button;
wherein the first type operation is a short-press of the physical operating button and the second type operation is a long-press of the physical operation button.

* * * * *